United States Patent
Yokota et al.

(10) Patent No.: US 11,069,086 B2
(45) Date of Patent: Jul. 20, 2021

(54) NON-TRANSITORY COMPUTER-READABLE STORAGE MEDIUM FOR STORING POSITION DETECTION PROGRAM, POSITION DETECTION METHOD, AND POSITION DETECTION APPARATUS

(71) Applicant: FUJITSU LIMITED, Kawasaki (JP)

(72) Inventors: Yasuto Yokota, Kawasaki (JP); Kanata Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 16/668,708

(22) Filed: Oct. 30, 2019

(65) Prior Publication Data

US 2020/0151906 A1 May 14, 2020

(30) Foreign Application Priority Data

Nov. 8, 2018 (JP) .............................. JP2018-210460

(51) Int. Cl.
*G06T 7/73* (2017.01)
*B25J 9/16* (2006.01)
*G06N 3/08* (2006.01)
*G06N 3/04* (2006.01)

(52) U.S. Cl.
CPC ................. *G06T 7/75* (2017.01); *B25J 9/163* (2013.01); *B25J 9/1697* (2013.01); *G06N 3/0454* (2013.01); *G06N 3/08* (2013.01); *G06T 2207/20081* (2013.01); *G06T 2207/20084* (2013.01)

(58) Field of Classification Search
CPC ..................... B25J 9/163; B25J 9/1697; G06T 2207/20081; G06T 2207/20084; G06T 2207/30164; G06T 3/4053; G06T 3/4076; G06T 7/75
USPC ......................................................... 382/103
See application file for complete search history.

(56) References Cited

U.S. PATENT DOCUMENTS

2017/0173798 A1* 6/2017 Watanabe .............. B25J 9/1697
2018/0211138 A1* 7/2018 Yamada ............. G06K 9/00201

OTHER PUBLICATIONS

Yaskawa Electric Corporation, "AI picking function that implements various ways of grasping a target object by a robot has been developed", Search:Oct. 22, 2018, the Internet <URL:https://www.yaskawa.co.jp/newsrelease/technology/35697>, 9 pages with English Translation.

* cited by examiner

*Primary Examiner* — Ajibola A Akinyemi
(74) *Attorney, Agent, or Firm* — Fujitsu Patent Center

(57) ABSTRACT

A non-transitory computer-readable storage medium storing a position detection program which causes a processor to perform processing for object recognition, the processing includes: acquiring a plurality of pieces of three-dimensional data of simple shapes that are not similar to each other; carrying out learning by using the plurality of acquired pieces of data; acquiring an image obtained by imaging by an imaging unit; and detecting a position of an object from the acquired image by using a first learning model generated based on the learning.

8 Claims, 14 Drawing Sheets

FIG. 6

| OBJECT OF DATASET FOR LEARNING | SIMPLE SHAPE MODEL A | SIMPLE SHAPE MODEL B | SIMPLE SHAPE MODEL C | SIMPLE SHAPE MODEL D | SIMPLE SHAPE MODEL E | ENSEMBLE LEARNING MODEL (RESULTS OF LEARNING MODELS OF A TO E ARE USED) |
|---|---|---|---|---|---|---|
| RELIABILITY | 0.39 | 0.37 | 0.25 | 0.11 | 0.09 | SUM OF A TO E: 1.21 |
| RESULT OF DETECTION DETERMINATION | × | × | × | × | × | ○ |

OBJECT SHAPE OF DETECTION TARGET IS UNKNOWN

TARGET OBJECT

EVEN UNKNOWN OBJECT THAT IS DIFFICULT TO DETECT WITH ONLY ONE LEARNING MODEL IS ENABLED TO BE DETECTED BY ENSEMBLE LEARNING

FIG. 8
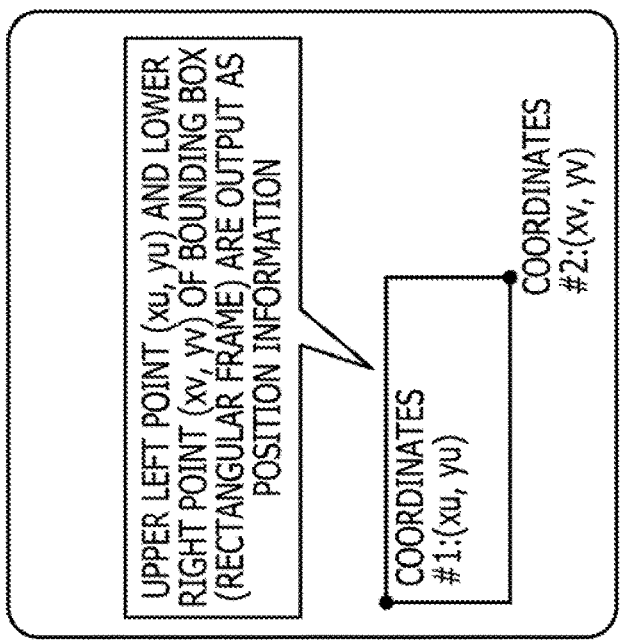
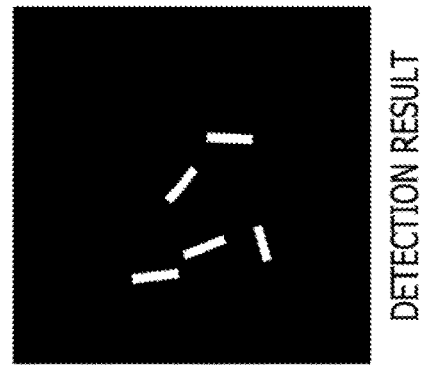
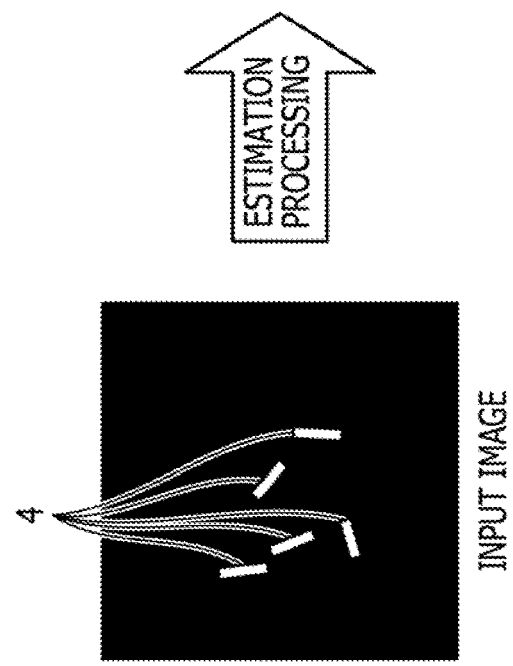

FIG. 9
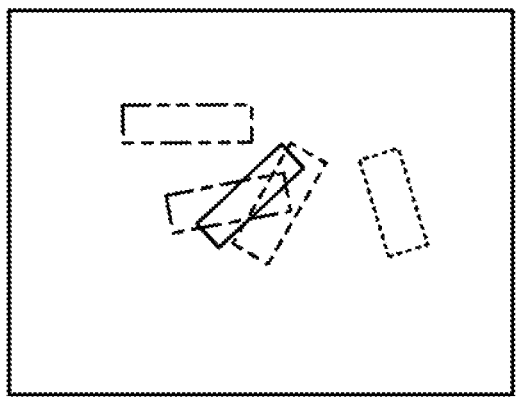
DETECTED-POSITION CANDIDATES
OF FIVE LEARNING MODELS
OVERLAPPING DETECTED-
POSITION CANDIDATES
ARE DEFINED AS
DETECTED-POSITION
GROUP
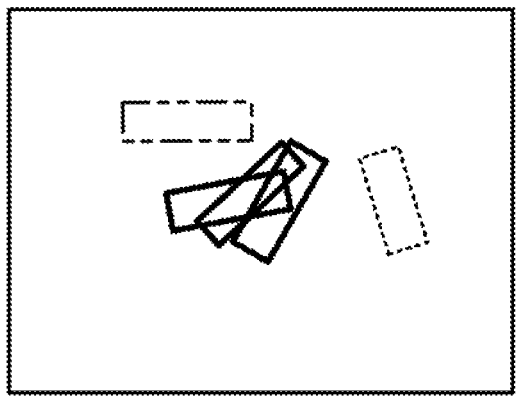
HEAVY LINES REPRESENT
DETECTED-POSITION GROUP

FIG. 12

| LEARNING MODEL | CIRCULAR COLUMN | RECTANGULAR PARALLELEPIPED | CUBE | SPHERE | SPRING |
|---|---|---|---|---|---|
| RELIABILITY | 0.21 | 0.13 | 0.08 | 0.02 | 0.95 |
| DETECTED-POSITION GROUP | × | × | × | × | × |

CASE IN WHICH OBJECT SHAPE OF DETECTION TARGET IS SPRING

TARGET OBJECT 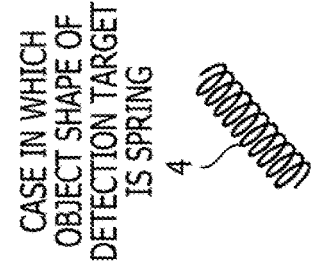

DETECTION IS POSSIBLE WITH ONLY SINGLE LEARNING MODEL

| LEARNING MODEL | CIRCULAR COLUMN | RECTANGULAR PARALLELEPIPED | CUBE | SPHERE | SPRING |
|---|---|---|---|---|---|
| RELIABILITY | 0.39 | 0.37 | 0.25 | 0.11 | 0.09 |
| DETECTED-POSITION GROUP | ○ | ○ | ○ | × | × |

CASE IN WHICH OBJECT SHAPE OF DETECTION TARGET IS UNKNOWN

TARGET OBJECT 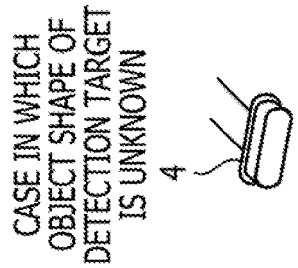

RELIABILITY IS LOW AND DETECTION IS DIFFICULT WITH ONLY SINGLE LEARNING MODEL
TOTAL RELIABILITY BECOMES 1.01 AND DETECTION BECOMES POSSIBLE THROUGH DEFINING DETECTED-POSITION GROUP

NON-TRANSITORY COMPUTER-READABLE STORAGE MEDIUM FOR STORING POSITION DETECTION PROGRAM, POSITION DETECTION METHOD, AND POSITION DETECTION APPARATUS

CROSS-REFERENCE TO RELATED APPLICATION

This application is based upon and claims the benefit of priority of the prior Japanese Patent Application No. 2018-210460, filed on Nov. 8, 2018, the entire contents of which are incorporated herein by reference.

FIELD

The embodiment discussed herein is related to a non-transitory computer-readable storage medium storing a position detection program, a position detection method, and a position detection apparatus.

BACKGROUND

In recent years, techniques for detecting a person or object in an image have been widely used. For example, in picking robots in factories and warehouses, techniques for detecting the position of an objected to be grasped from an image are used.

As a technique for detecting an object in an image, there is template matching. FIG. 14 is a diagram for explaining template matching. In the template matching, a detection apparatus stores an image of an object to be detected as a template image 91 in advance and searches for a range with a high degree of similarity to the template image 91 from an input image 92. The detection apparatus calculates the degree of similarity between an image in a search window 93 and the template image 91 while sliding the search window 93 on the input image 92, and determines that the object exists at the position at which the degree of similarity is the highest.

Furthermore, there is the single shot multibox detector (SSD) as a technique for detecting an object in an image by using a neural network (NN) that carries out deep learning. In the SSD, the user prepares a dataset of input images with correct answer labels in advance and causes a convolutional NN that is an NN dedicated to learning of images to learn the prepared dataset. The NN after the learning detects an object in an input image and outputs the position of the detected object and reliability that represents the likelihood of the detection target.

There is a technique in which teaching is made unnecessary by inputting image information from a camera attached to the tip of a robot arm to a controller and causing the robot to learn and generate action in real time by itself by using deep learning.

An example of the related art is disclosed in "AI picking function that implements various ways of grasping a target object by a robot has been developed" [Retrieved on Oct. 22, 2018], the Internet <URL:https://www.yaskawa.co.jp/newsrelease/technology/35697>

SUMMARY

According to an aspect of the embodiment, a non-transitory computer-readable storage medium storing a position detection program which causes a processor to perform processing for object recognition, the processing includes: acquiring a plurality of pieces of three-dimensional data of simple shapes that are not similar to each other; carrying out learning by using the plurality of acquired pieces of data; acquiring an image obtained by imaging by an imaging unit; and detecting a position of an object from the acquired image by using a first learning model generated based on the learning.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a detection example based on an ensemble learning model;
FIG. 8 is a diagram for explaining processing of estimating a position of a target object from an input image;
FIG. 9 is a diagram for explaining a detected-position group;
FIG. 12 is a diagram for explaining an effect of a detected-position group.

DESCRIPTION OF EMBODIMENT

The template matching and the SSD involve a problem that it is difficult to detect an object with a shape different from a shape envisaged in advance.

In one aspect, the embodiment discussed herein intends to enhance the possibility of detection of an object with a shape different from a shape envisaged in advance.

An embodiment of a position detection program, a position detection method, and a position detection apparatus disclosed by the present application will be described in detail below based on the drawings. The embodiment does not limit techniques of the disclosure.

EMBODIMENT

Figure 1:
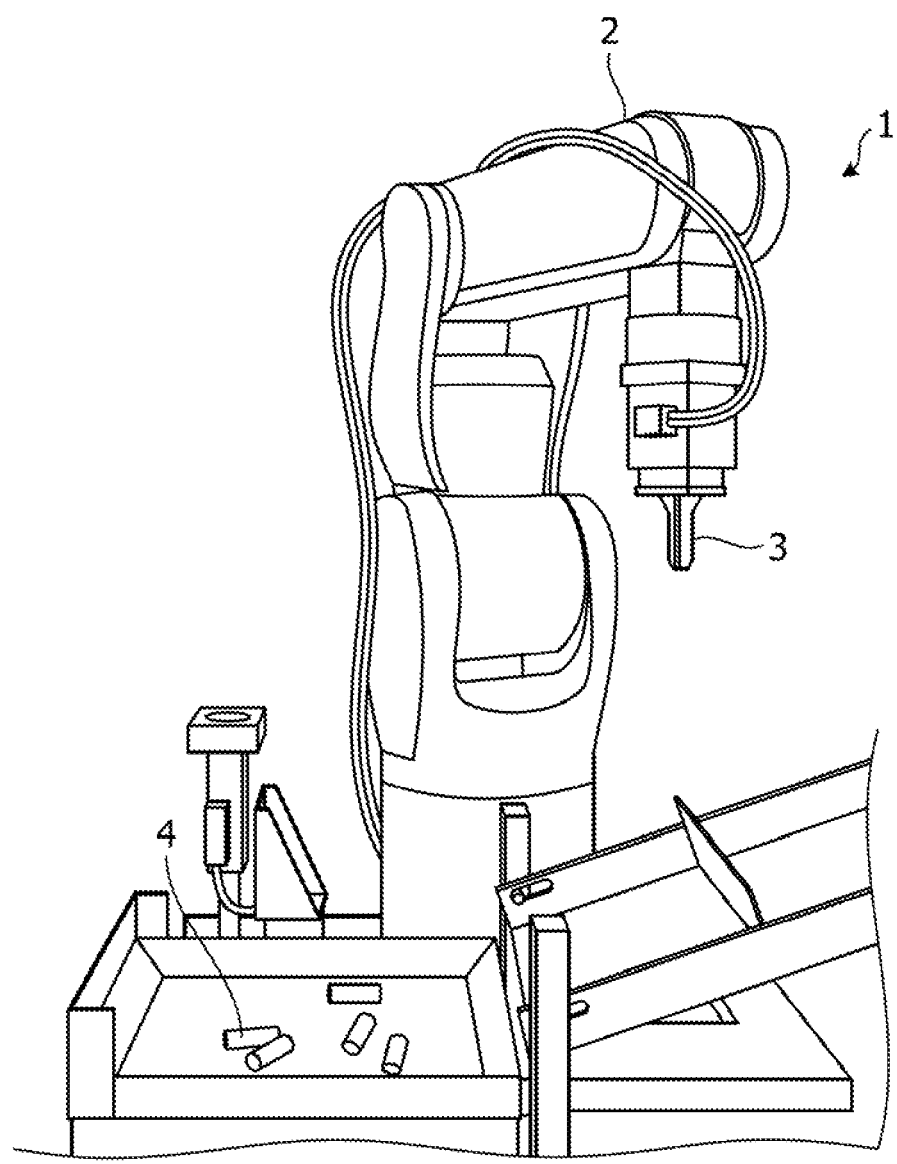
FIG. 1 illustrates an outline of a picking robot.

First, description will be made about a picking robot. FIG. 1 is a diagram illustrating an outline of a picking robot. As illustrated in FIG. 1, a picking robot 1 is a robot that grasps and moves a target object 4 by using a gripper 3 attached to the tip of an arm 2. The picking robot 1 is used when a component or product is grasped and moved in a factory, or when a piece of baggage is grasped and moved in a warehouse, or the like.

Figure 2:
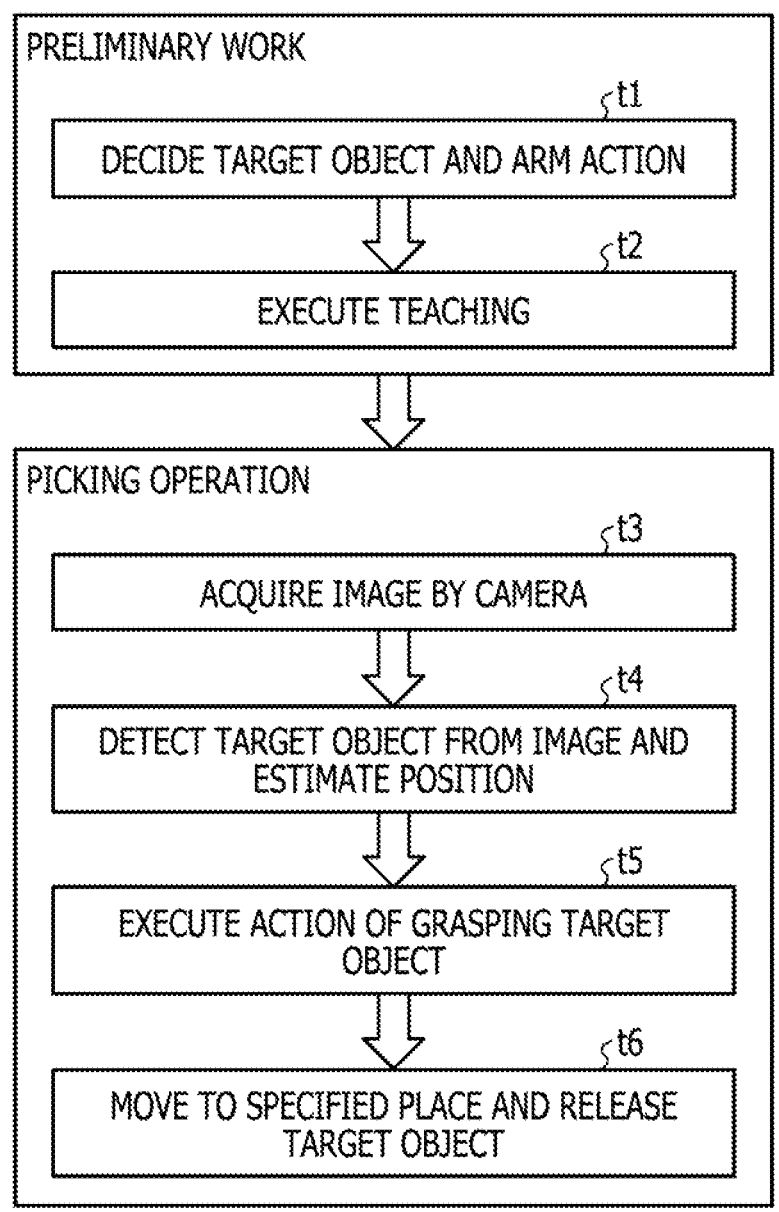
FIG. 2 illustrates one example of a flow of picking.

FIG. 2 is a diagram illustrating one example of a flow of picking. As illustrated in FIG. 2, as preliminary work, a user decides the target object 4 and arm action of the picking (t1) and executes teaching (t2). Here, the "teaching" refers to setting information on the shape of the target object 4 and so forth and the arm action in a robot control program in advance.

Then, the picking robot 1 for which the teaching has been executed carries out picking operation. For example, the picking robot 1 acquires an image by a camera (t3) and detects the target object 4 from an image and estimates the position (t4). Then, the picking robot 1 executes action of grasping the target object 4 (t5) and moves to a specified place and releases the target object 4 (t6).

As above, the teaching is desired to be carried out in advance in order to operate the picking robot 1. When the shape of the target object 4 or the ambient environment changes, the teaching is desired to be carried out again. Thus, how to reduce the man-hour for the teaching is important.

Furthermore, in image recognition by deep learning, improvement in the recognition accuracy is intended by carrying out learning with use of a large amount of learning data and thus the large amount of learning data is desired. If a large number of pieces of open data that may be used exist, it is not difficult to ensure the number of pieces of learning data. However, the open data hardly exists in the field of picking work and the number of pieces of data that may be used as the learning data is not large. Therefore, in the field of picking work, how to prepare the learning data is important.

Moreover, in terms of the picking, the whole of the target object 4 does not need to be recognized and it is important that the part that may be gripped may be recognized. Shapes that may be gripped are simple shapes such as circular column, rectangular parallelepiped, cube, regular polyhedron, circular cone, pyramid, sphere, torus (doughnut shape), and spiral and the target object 4 of picking includes a part of any of these simple shapes. Such simple shapes are referred to as primitive in some cases.

Figure 3:
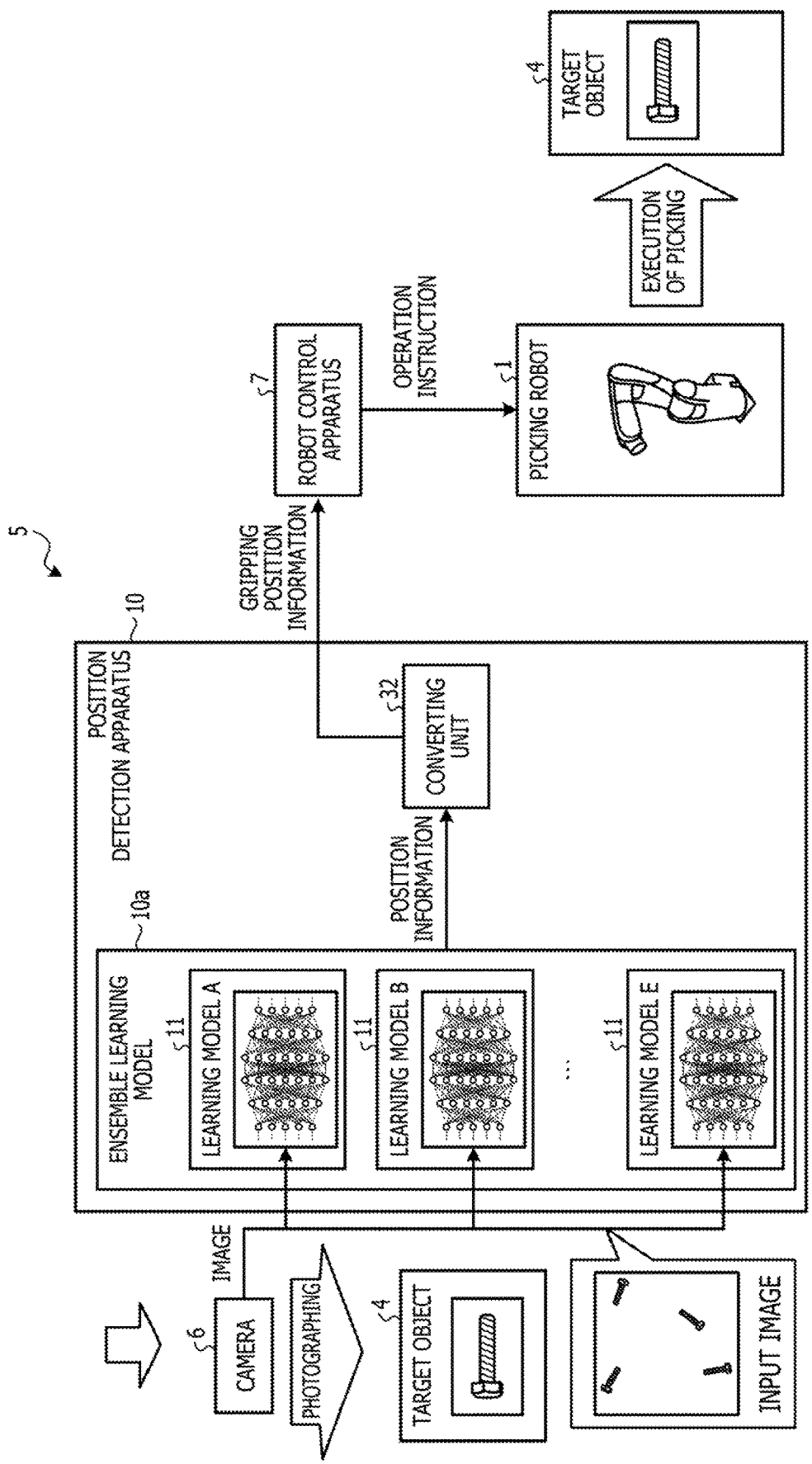
FIG. 3 illustrates a configuration of a picking robot system according to an embodiment.

Next, the configuration of a picking robot system according to the embodiment will be described. FIG. 3 is a diagram illustrating a configuration of a picking robot system according to the embodiment. As illustrated in FIG. 3, a picking robot system 5 according to the embodiment includes the picking robot 1, a camera 6, a robot control apparatus 7, and a position detection apparatus 10.

The camera 6 images the target object 4 and outputs an image obtained by the imaging to the position detection apparatus 10. The image obtained by the imaging by the camera 6 is input to the position detection apparatus 10 and the position detection apparatus 10 outputs gripping position information to the robot control apparatus 7. The robot control apparatus 7 makes an operation instruction to the picking robot 1 based on the gripping position information. The picking robot 1 executes picking for the target object 4.

The position detection apparatus 10 includes an ensemble learning model 10a and a converting unit 32. The ensemble learning model 10a includes five learning models 11 represented by learning model A to learning model E. The learning models 11 are NNs that have gone through deep learning of a dataset for learning. The learning models 11 are NNs based on the SSD. The image photographed by the camera 6 is input to the learning models 11 and the learning models 11 detect the target object 4 and output position information and reliability. The ensemble learning model 10a outputs position information of the target object 4 based on the position information and the reliability output by each learning model 11. The position information of the target object 4 is input to the converting unit 32 and the converting unit 32 outputs the gripping position information.

Figure 4:
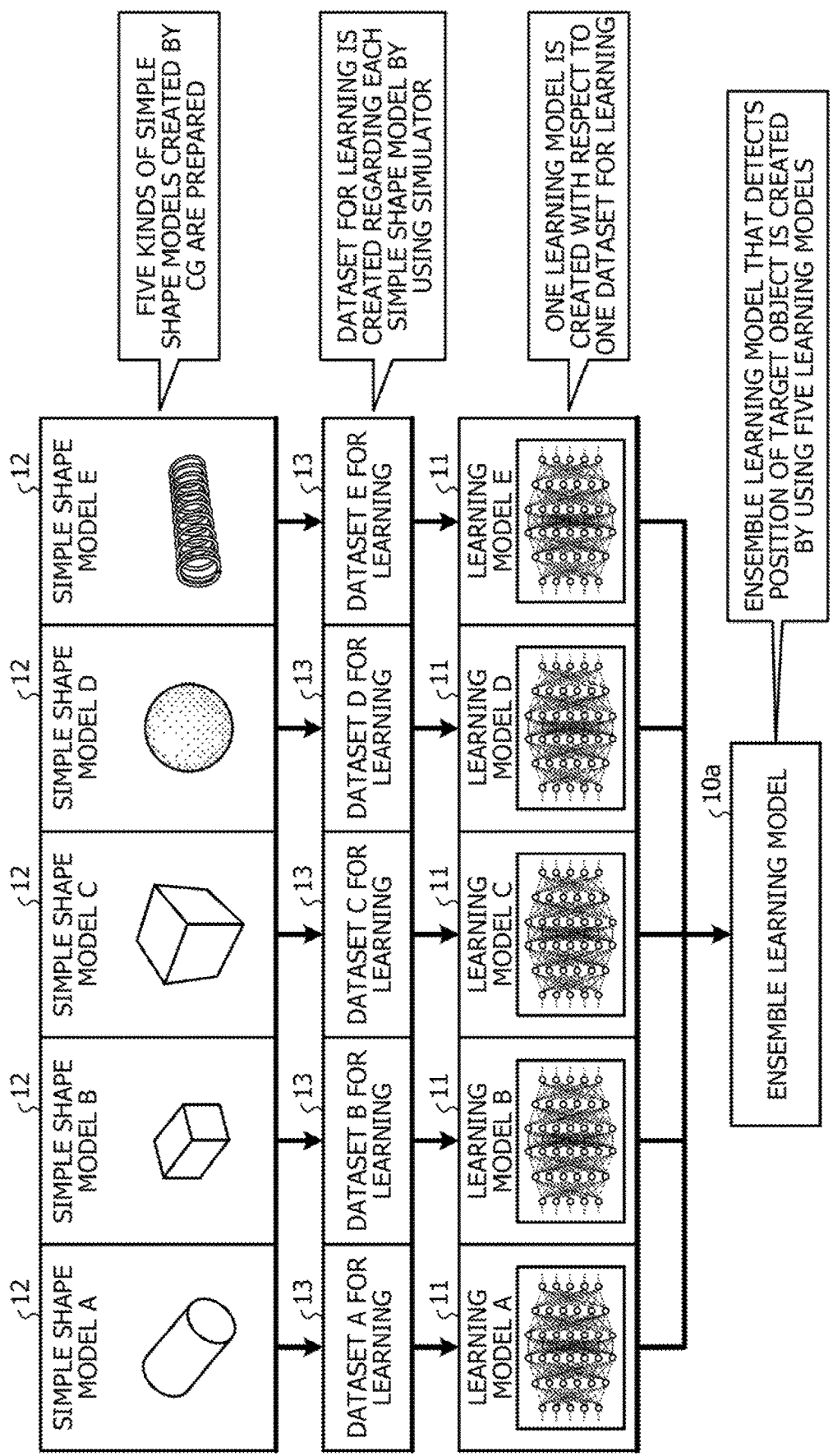
FIG. 4 illustrates a flow of creation of an ensemble learning model.

FIG. 4 is a diagram illustrating the flow of creation of the ensemble learning model 10a. The user prepares five kinds of simple shape models 12 represented by simple shape model A to simple shape model E by using computer graphics (CG). Here, the simple shape models 12 are three-dimensional models with a simple shape. Each simple shape model 12 is not similar to the other simple shape models 12. In FIG. 4, simple shape model A is a three-dimensional model of a circular column, and simple shape model B is a three-dimensional model of a rectangular parallelepiped, and simple shape model C is a three-dimensional model of a cube. Furthermore, simple shape model D is a three-dimensional model of a sphere and simple shape model E is a three-dimensional model of a spring.

Then, the user creates a dataset 13 for learning regarding each simple shape model 12 by using a simulator of the picking robot 1. Then, the position detection apparatus 10 creates one learning model 11 with respect to one dataset 13 for learning. Learning model A is created from dataset A for learning, and learning model B is created from dataset B for learning, and learning model C is created from dataset C for learning. Learning model D is created from dataset D for learning, and learning model E is created from dataset E for learning.

Then, the position detection apparatus 10 creates the ensemble learning model 10a that detects the position of the target object 4 by using the five learning models 11. The ensemble learning model 10a employs the sum of the reliabilities of the five learning models 11 as the reliability of the ensemble learning model 10a regarding each piece of position information, for example, and determines that the target object 4 is detected if the reliability is equal to or higher than a reference value. The reference value is 1.0, for example.

The number of simple shape models 12 used for learning may be either larger or smaller than 5. However, when the number of simple shape models 12 is larger, it takes a longer time to execute the processing although the versatility of the position detection apparatus 10 becomes higher. Therefore, it is preferable that the number be 5 to 10. If the kind of shape of the picking target has been decided in advance, the position detection apparatus 10 may use a model obtained by abstracting the shape of the picking target. Alternatively, a partial simple shape included in the shape of the picking target may be allowed to be selected as a simple shape model.

Figure 5:
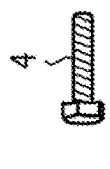
FIG. 5 illustrates detection examples based on simple shape models.

FIG. 5 is a diagram illustrating detection examples based on the simple shape models 12. Case #1 represents the case in which the object of the detection target is a "bolt" and case #2 represents the case in which the object of the detection target is an "integrated circuit (IC) chip." Furthermore, suppose that the reliability as the criterion of detection determination is 0.5.

In case #1, if the subject of the dataset 13 for learning is an actually-photographed bolt, the reliability is 0.95 and therefore the bolt is detected. However, if the subject of the dataset 13 for learning is an actually-photographed IC chip, the reliability is 0.09 and therefore the bolt is not detected. Furthermore, if the subject of the dataset 13 for learning is the three-dimensional model of the circular column as one of the simple shape models 12, the reliability is 0.83 and therefore the bolt is detected.

In case #2, if the subject of the dataset 13 for learning is an actually-photographed bolt, the reliability is 0.13 and therefore the IC chip is not detected. If the subject of the dataset 13 for learning is an actually-photographed IC chip, the reliability is 0.92 and therefore the IC chip is detected. Furthermore, if the subject of the dataset 13 for learning is the three-dimensional model of the circular column as one of the simple shape models 12, the reliability is 0.61 and therefore the IC chip is detected.

As above, the position detection apparatus 10 may avoid overtraining of the shape of the target object 4 and widen the width of the degree of similarity of the shape that may be detected by causing the simple shape model 12 to be learned.

FIG. 6 is a diagram illustrating a detection example based on the ensemble learning model 10a. In FIG. 6, the object shape of the detection target is unknown. Suppose that, in FIG. 6, the reliability as the criterion of detection determination is 0.5 in the single learning model 11 and the reliability as the criterion of detection determination is 1.0 in the ensemble learning model 10a.

As illustrated in FIG. 6, it is difficult for each learning model 11 created from a respective one of the simple shape models 12 to detect the target object 4 because the reliability is lower than 0.5. On the other hand, the ensemble learning model 10a may detect the target object 4 by using the result of each learning model 11. In FIG. 6, the sum of the reliabilities of the five learning models 11 is 0.3+0.37+0.25+ 0.11+0.09=1.21 and is equal to or higher than 1.0 and therefore the ensemble learning model 10a may detect the target object 4.

As above, the position detection apparatus 10 may dramatically widen the range of the shape that may be detected by using the ensemble learning model 10a.

Figure 7:
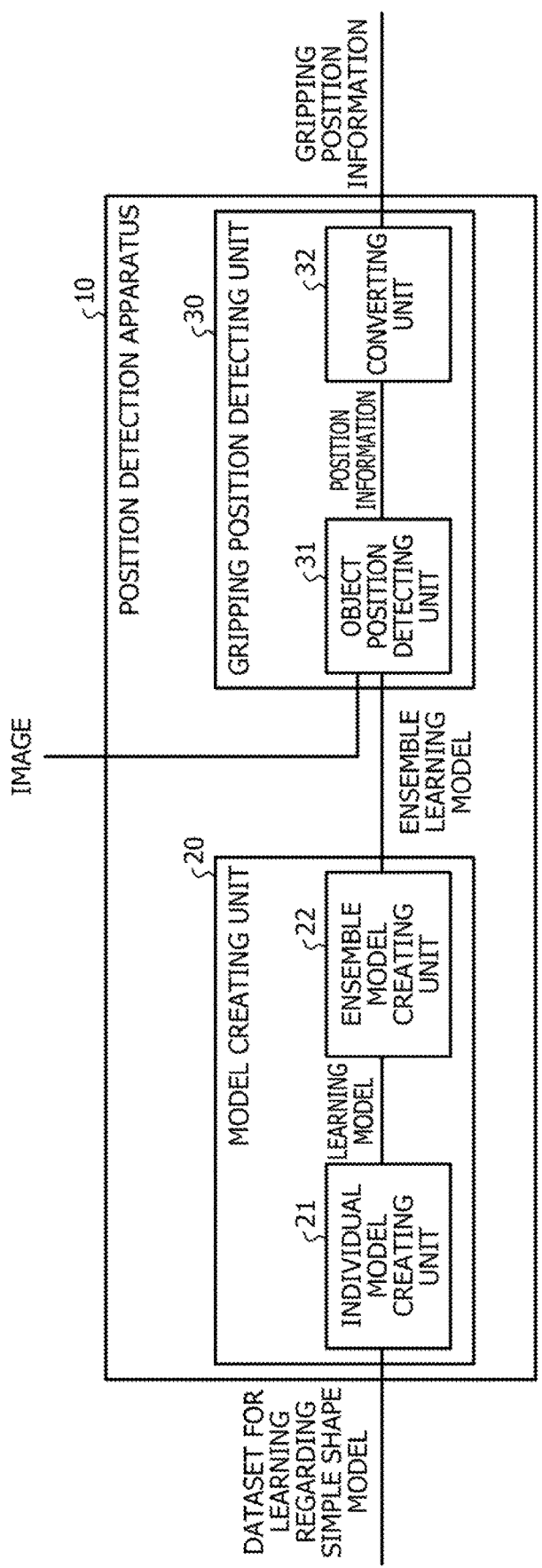
FIG. 7 illustrates a functional configuration of a position detection apparatus.

Next, the functional configuration of the position detection apparatus 10 will be described. FIG. 7 is a diagram illustrating the functional configuration of the position detection apparatus 10. As illustrated in FIG. 7, the position detection apparatus 10 includes a model creating unit 20 and a gripping position detecting unit 30. The model creating unit 20 acquires the datasets 13 for learning regarding the five simple shape models 12 and creates the ensemble learning model 10a based on the five simple shape models 12. The gripping position detecting unit 30 acquires an image obtained by imaging the target object 4 and detects the position of the target object 4 in the image by using the ensemble learning model 10a. Then, the gripping position detecting unit 30 identifies the gripping position based on the detected position and outputs gripping position information.

The model creating unit 20 includes an individual model creating unit 21 and an ensemble model creating unit 22. The gripping position detecting unit 30 includes an object position detecting unit 31 and the converting unit 32.

The individual model creating unit 21 acquires the datasets 13 for learning regarding the five simple shape models 12 and creates five learning models 11 that each arise from learning of the acquired five datasets 13 for learning. In each dataset 13 for learning, 10,000 pieces of data with a correct answer label of the detected position are included, for example. Furthermore, the individual model creating unit 21 causes the learning model 11 to carry out 100 epochs of training regarding each dataset 13 for learning.

The ensemble model creating unit 22 creates the ensemble learning model 10a by using the five learning modes 11 created by the individual model creating unit 21. The ensemble model creating unit 22 creates the ensemble learning model 10a that employs the sum of the reliabilities of the five learning models 11 as the reliability regarding each piece of position information and determines that the target object 4 is detected if the reliability is equal to or higher than the reference value.

The object position detecting unit 31 acquires the image obtained by imaging the target object 4 and detects the position of the target object 4 in the image by using the ensemble learning model 10a and outputs position information. FIG. 8 is a diagram for explaining processing of estimating the position of the target object 4 from an input image. As illustrated in FIG. 8, the object position detecting unit 31 detects the target object 4 from the input image and outputs an upper left point (xu, yu) and a lower right point (xv, yv) of a bounding box as the position information.

Here, the bounding box is a rectangular frame that defines the position of the target object 4. The bounding box is defined by the x-coordinate and y-coordinate of the two points at the upper left and the lower right, for example. The origin of the coordinate axes is the lower left of the input image, for example.

The ensemble learning model 10a selects, as detected-position candidates, five pieces of position information in decreasing order of reliability from the highest reliability from the pieces of position information output by each learning model 11 and creates the position information of the target object 4 based on 25 detected-position candidates in total by the five learning models 11.

For example, if overlapping exists in the bounding boxes of detected-position candidates, the ensemble learning model 10a carries out grouping of the detected-position candidates to make a detected-position group. FIG. 9 is a diagram for explaining a detected-position group. In FIG. 9, only five detected-position candidates in the 25 detected-position candidates are illustrated.

In FIG. 9, overlapping exists in three bounding boxes in the five bounding boxes. Thus, the three bounding boxes are grouped and frames represented by heavy lines represent a detected-position group. The reliability of the detected-position group is the sum of the reliabilities of the detected-position candidates involving the overlapping.

Then, the ensemble learning model 10a selects the detected-position candidate or detected-position group with the highest reliability as the position information of the target object 4. If the detected-position group is selected as the position information of the target object 4, the ensemble learning model 10a calculates coordinates (X, Y) of the upper left point of the bounding box by the following expression.

$$(X,Y)=(s1(x1,y1)+s2(x2,y2)+ \ldots +sn(xn,yn))/(s1+s2+ \ldots +sn).$$

Here, n is the number of detected-position candidates included in the detected-position group, and si (i=1, 2, ..., n) is the reliability of a detected-position candidate i, and (xi, yi) is the coordinates of the upper left point of the bounding box of the detected-position candidate i. The coordinates of the lower right point of the bounding box are also similarly calculated.

Then, the ensemble learning model 10a outputs the coordinates of the upper left and lower right of the bounding box as the position information of the target object 4. The object position detecting unit 31 transfers the position information output by the ensemble learning model 10a to the converting unit 32.

The converting unit 32 acquires the position information from the object position detecting unit 31 and converts the acquired position information to gripping position information. The converting unit 32 converts the position information to the gripping position information based on the position information and the place of the shape that may be gripped in the target object 4.

Figure 10:
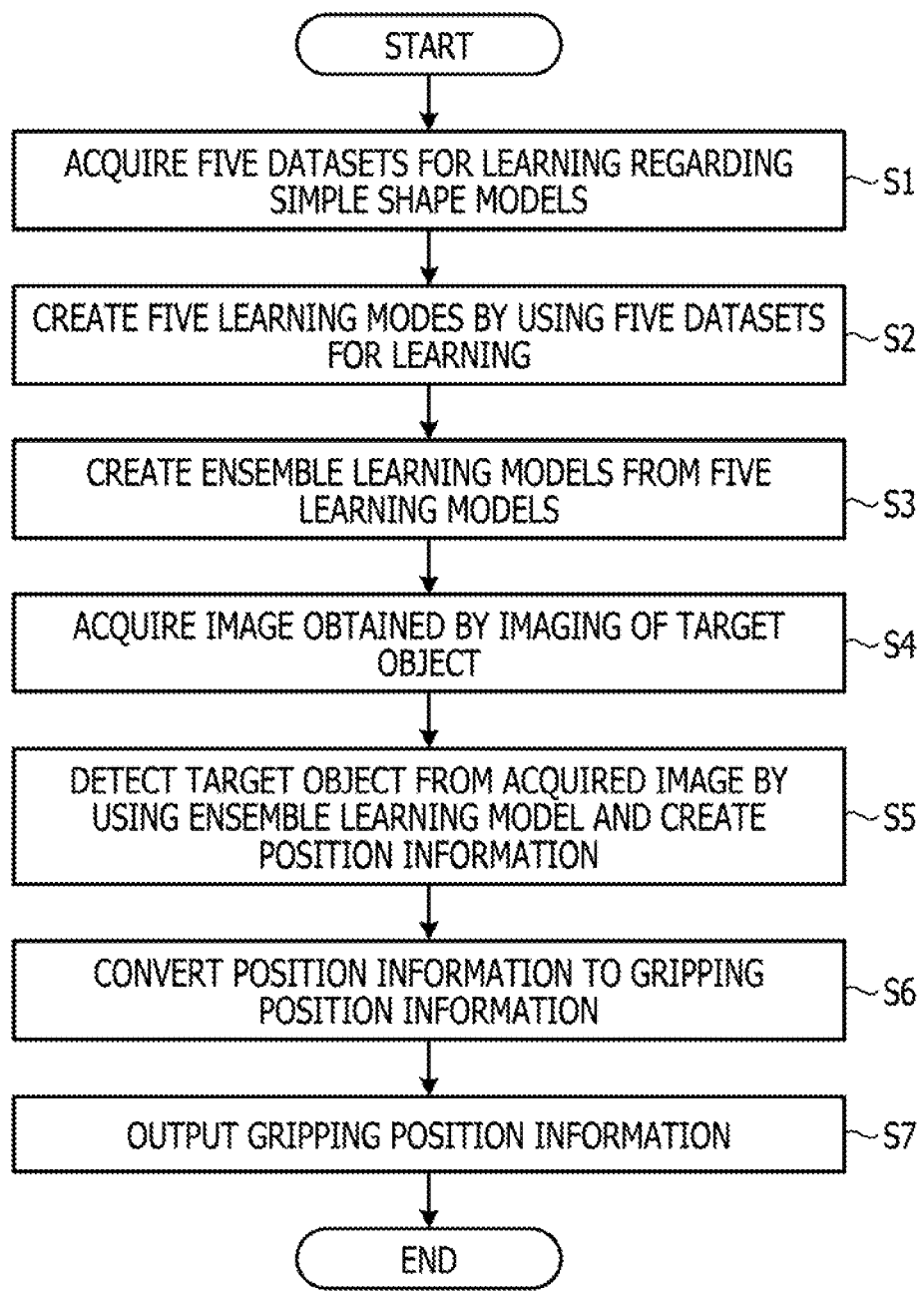
FIG. 10 is a flowchart illustrating a flow of processing by a position detection apparatus.

Next, the flow of processing by the position detection apparatus 10 will be described. FIG. 10 is a flowchart illustrating the flow of the processing by the position detection apparatus 10. As illustrated in FIG. 10, the position detection apparatus 10 acquires five datasets 13 for learning regarding the simple shape models 12 (step S1) and creates five learning models 11 by using the five datasets 13 for learning (step S2). Then, the position detection apparatus 10 creates the ensemble learning model 10a from the five learning models 11 (step S3).

Then, the position detection apparatus 10 acquires an image obtained by imaging of the target object 4 (step S4) and detects the target object 4 from the acquired image by using the ensemble learning model 10a and creates position information (step S5). Then, the position detection apparatus 10 converts the position information to gripping position information (step S6) and outputs the gripping position information (step S7).

As above, the position detection apparatus 10 creates the ensemble learning model 10a by using the five learning modes 11 that each arise from learning of the datasets 13 for learning regarding the five simple shape models 12 and detects the target object 4 by using the ensemble learning model 10a. Therefore, the position detection apparatus 10 may detect an object with a shape different from a shape envisaged in advance.

Figure 11:
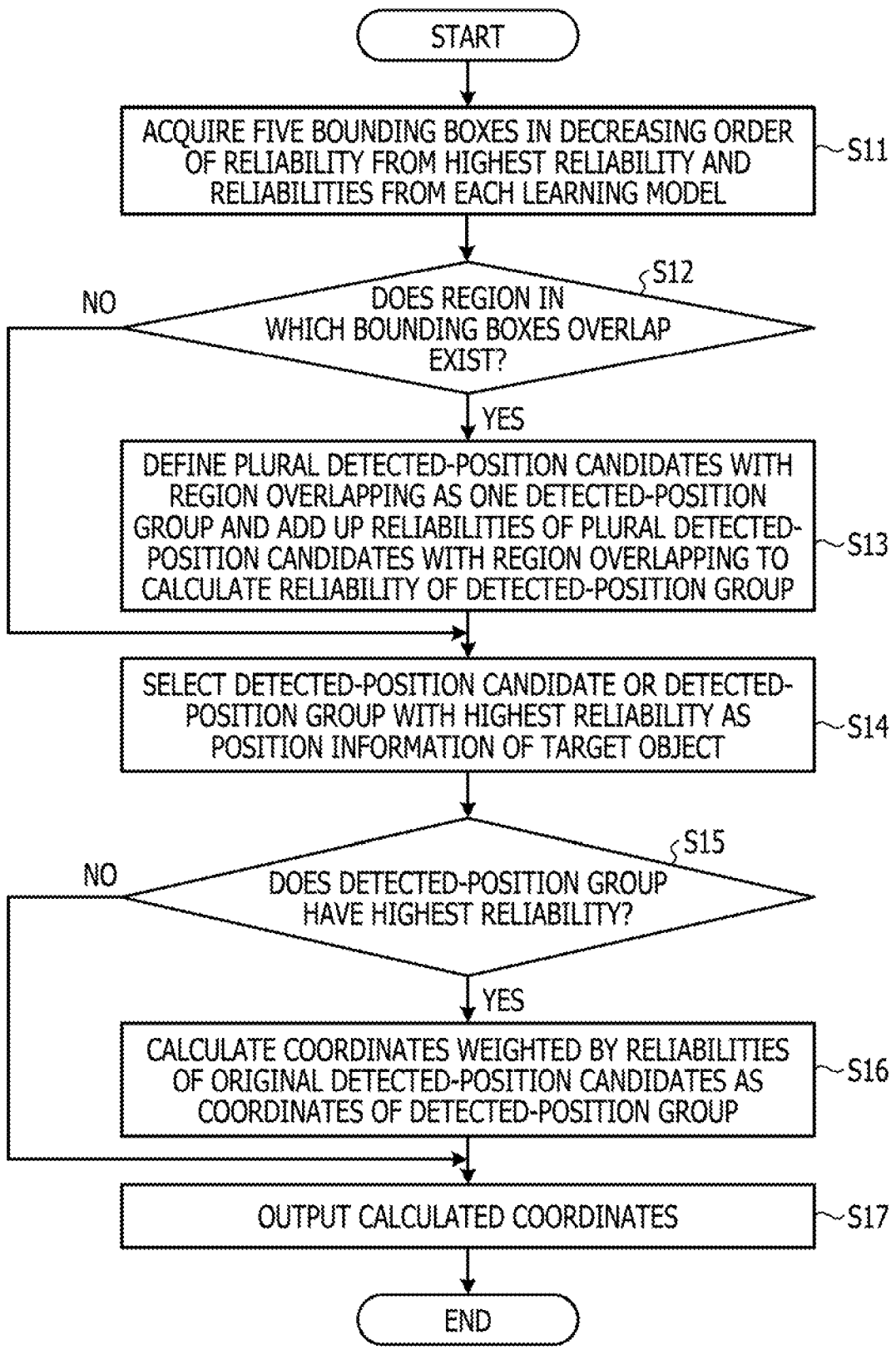
FIG. 11 is a flowchart illustrating a flow of processing by an ensemble learning model.

Next, the flow of processing by the ensemble learning model 10a will be described. FIG. 11 is a flowchart illustrating the flow of the processing by the ensemble learning model 10a. As illustrated in FIG. 11, the ensemble learning model 10a acquires five bounding boxes in decreasing order of reliability from the highest reliability and the reliabilities from each learning model 11 (step S11).

Then, the ensemble learning model 10a determines whether or not a region in which bounding boxes overlap exists (step S12). Then, if the region exists, the ensemble learning model 10a defines the plural detected-position candidates with region overlapping as one detected-position group and adds up the reliabilities of the plural detected-position candidates with region overlapping to calculate the reliability of the detected-position group (step S13).

Then, the ensemble learning model 10a selects the detected-position candidate or detected-position group with the highest reliability as the position information of the target object 4 (step S14) and determines whether or not the detected-position group has the highest reliability (step S15). Then, if the detected-position group has the highest reliability, the ensemble learning model 10a calculates coordinates weighted by the reliabilities of the original detected-position candidates as the candidates of the detected-position group (step S16).

Then, the ensemble learning model 10a outputs the calculated coordinates as the position information of the target object 4 (step S17).

As above, the ensemble learning model 10a defines the detected-position candidates with region overlapping as one detected-position group and adds up the reliabilities of the detected-position candidates with overlapping to yield the reliability of the detected-position group. Therefore, the ensemble learning model 10a may detect the target object 4 that is difficult to detect with only the single learning models 11.

FIG. 12 is a diagram for explaining an effect of a detected-position group. Suppose that, in FIG. 12, the reference value of the single learning model 11 is 0.5 and the reference value of the ensemble learning model 10a is 1.0.

As illustrated in FIG. 12, in the case in which the object shape of the detection target is a spring, a detected-position group is not defined. Furthermore, in the single learning models 11, the reliability of the learning model 11 that has learned the spring becomes 0.5 or higher. Thus, detection is possible only with the learning model 11 that has learned the spring.

On the other hand, in the case in which the object shape of the detection target is unknown, a detected-position candidate output by the learning model 11 that has learned a circular column, a detected-position candidate output by the learning model 11 that has learned a rectangular parallelepiped, and a detected-position candidate output by the learning model 11 that has learned a cube are grouped. Then, the reliability of the detected-position group becomes 0.39+0.37+0.25=1.01 and the object whose object shape is unknown is detected by the ensemble learning model 10a using the detected-position group.

As described above, in the embodiment, the individual model creating unit 21 creates the plural learning models 11 by using each of the plural datasets 13 for learning created from the plural simple shape models 12. Then, the ensemble model creating unit 22 creates the ensemble learning model 10a based on the plural learning models 11. Then, by using the ensemble learning model 10a, the object position detecting unit 31 detects the target object 4 from an image obtained by imaging the target object 4 and creates position information. Therefore, the position detection apparatus 10 may avoid overtraining of the shape of the target object 4 and enhance the possibility of detection of an object with a shape different from a shape envisaged in advance.

Furthermore, in the embodiment, the position detection apparatus 10 converts the position information to gripping position information and outputs the gripping position information to the robot control apparatus 7. Therefore, teaching of the picking robot 1 may be made unnecessary even when the shape of the target object 4 is changed, and the man-hour for the teaching may be reduced.

Moreover, in the embodiment, if overlapping exists in bounding boxes of detected-position candidates, the ensemble learning model 10a carries out grouping of the detected-position candidates to make a detected-position group and employs the sum of the reliabilities of the detected-position candidates with overlapping as the reliability of the detected-position group. Therefore, the position detection apparatus 10 may detect the unknown object that is difficult to detect with only one learning model 11.

Furthermore, in the embodiment, the dataset 13 for learning regarding the simple shape model 12 is created by a robot simulator and thus the datasets 13 for learning with an amount sufficient for learning may be easily created.

Moreover, in the embodiment, the position detection apparatus 10 uses circular column, rectangular parallelepiped, cube, sphere, and spring as simple shapes and thus the versatility of the object shape that may be detected may be enhanced.

Although description is made about the position detection apparatus 10 in the embodiment, a position detection program having similar functions may be obtained by implementing the configuration which the position detection apparatus 10 has by software. Thus, a computer that executes the position detection program will be described.

Figure 13:
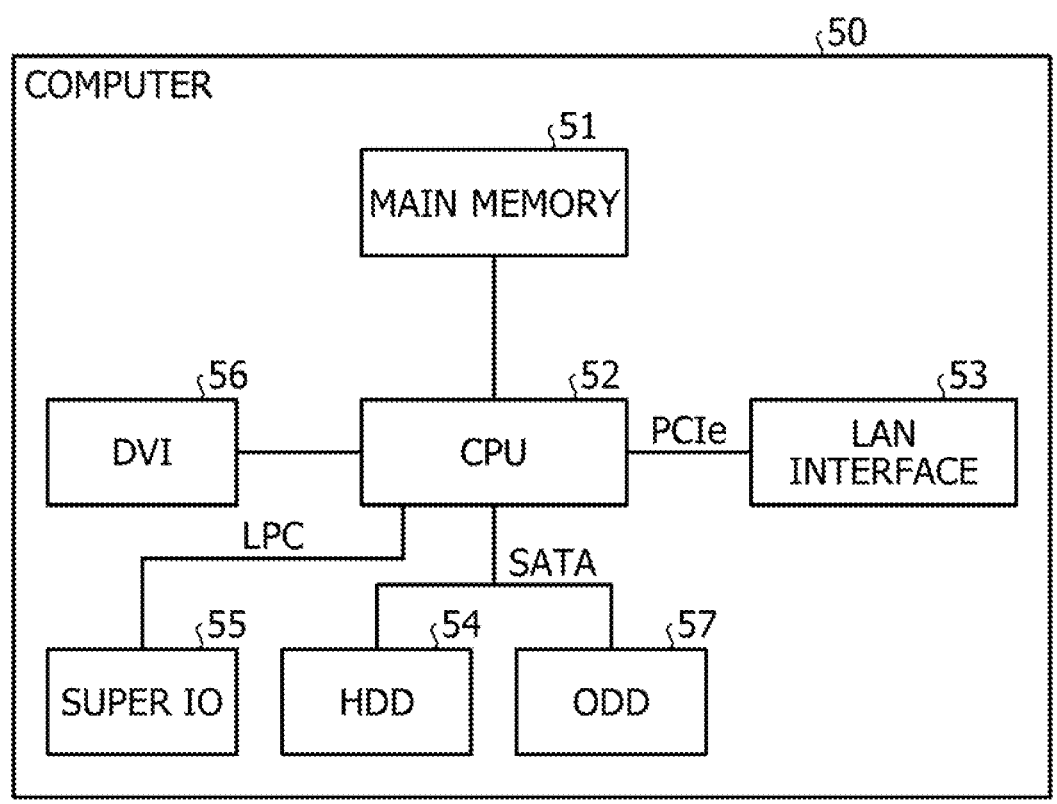
FIG. 13 illustrates a hardware configuration of a computer that executes a position detection program according to an embodiment.
Figure 14:
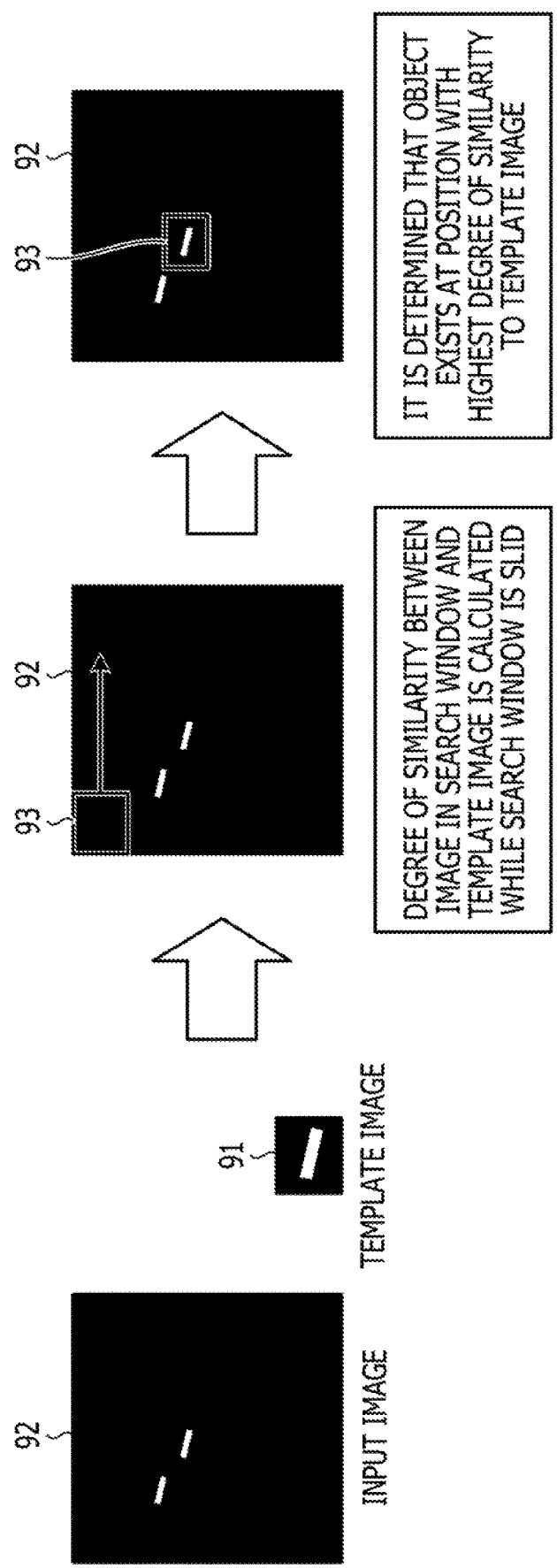
FIG. 14 is a diagram for explaining template matching.

FIG. 13 is a diagram illustrating a hardware configuration of a computer that executes a position detection program according to the embodiment. As illustrated in FIG. 13, a computer 50 includes a main memory 51, a central processing unit (CPU) 52, a local area network (LAN) interface 53, and a hard disk drive (HDD) 54. Furthermore, the computer 50 includes a Super input output (10) 55, a digital visual interface (DVI) 56, and an optical disk drive (ODD) 57.

The main memory 51 is a memory that stores a program, an execution interim result of the program, and so forth. The CPU 52 is a central processing apparatus that reads out the program from the main memory 51 and executes the program. The CPU 52 includes a chipset including a memory controller.

The LAN interface 53 is an interface for coupling the computer 50 to another computer via a LAN. The HDD 54 is a disk apparatus that stores programs and data and the Super IO 55 is an interface for coupling input apparatuses such as mouse and keyboard. The DVI 56 is an interface that couples a liquid crystal display apparatus and the ODD 57 is an apparatus that carries out reading and writing of a digital versatile disc (DVD).

The LAN interface 53 is coupled to the CPU 52 based on peripheral component interconnect express (PCIe) and the HDD 54 and the ODD 57 are coupled to the CPU 52 based on serial advanced technology attachment (SATA). The Super IO 55 is coupled to the CPU 52 based on low pin count (LPC).

Furthermore, the position detection program executed in the computer 50 is stored in a DVD that is one example of a recording medium readable by the computer 50 and is read out from the DVD by the ODD 57 to be installed on the computer 50. Alternatively, the position detection program is stored in a database or the like of another computer system coupled through the LAN interface 53 and is read out from this database to be installed on the computer 50. Then, the installed position detection program is stored in the HDD 54 and is read out to the main memory 51 to be executed by the CPU 52.

Moreover, in the embodiment, description is made about the case in which the ensemble learning model creates position information and the converting unit converts the position information to gripping position information. However, the ensemble learning model may directly create the gripping position information. In this case, the ensemble learning model replaces the object detection range by the gripping position range and outputs the gripping position range with the reliability and the gripping angle.

Furthermore, in the embodiment, the case in which the position detection apparatus 10 is used with the picking robot 1 is described. However, the position detection apparatus 10 may be used with other apparatuses such as robot for medical use, cooking robot, machinery for civil engineering and construction, automatic traveling vehicle, drone, and household electrical appliance.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a position detection program which causes a processor to perform processing for object recognition, the processing comprising:
    acquiring, as training data, a plurality of pieces of three-dimensional shape data of simple shapes that are not similar to each other, each of the plurality of pieces of three-dimensional shape data being three-dimensional shape data representing a simple shape obtained from a three-dimensional model, the simple shape being a shape simplified more than a shape of a target object;
    carrying out learning by using, as an input to a neural network, the simple shape represented by each of the plurality of acquired pieces of three-dimensional shape data;
    acquiring an image obtained by imaging by an imaging device; and
    detecting a position of the target object from the acquired image by using a first learning model generated based on the learning.

2. The position detection program according to claim 1, the processing further comprising:
    detecting a gripping position of the object from the position.

3. The position detection program according to claim 1, wherein
    the first learning model is an ensemble learning model based on a plurality of second learning models generated through carrying out learning by using each of the plurality of pieces of data.

4. The position detection program according to claim 3, wherein
    the second learning model is a convolutional neutral network using deep learning and creates, from the image, a plurality of bounding boxes that represent a detected position of an object as position candidates in such a manner as to associate the bounding boxes with reliability that represents likelihood of a detected object, and
    the ensemble learning model acquires a second number of position candidates from each of a first number of second learning models and, when an overlapping region exists in bounding boxes of position candidates in a number obtained by multiplying the first number by the second number, the ensemble learning model groups position candidates having the overlapping region and employs sum of reliabilities of the grouped position candidates as reliability of the group to output a bounding box of the group or position candidate with highest reliability as information on the position of the object.

5. The position detection program according to claim 1, wherein
    the pieces of data are pieces of data created from three-dimensional models of the simple shapes by a simulator.

6. The position detection program according to claim 1, wherein
    the simple shapes include a circular column, a rectangular parallelepiped, a cube, a sphere, and a spring.

7. A position detection method comprising:
    by a computer,
    acquiring, as training data, a plurality of pieces of three-dimensional shape data of simple shapes that are not similar to each other, each of the plurality of pieces of three-dimensional shape data being three-dimensional shape data representing a simple shape obtained from a three-dimensional model, the simple shape being a shape simplified more than a shape of a target object;

carrying out learning by using, as an input to a neural network, the simple shape represented by each of the plurality of acquired pieces of three-dimensional shape data;

acquiring an image obtained by imaging by an imaging device; and detecting a position of the target object from the acquired image by using a first learning model generated based on the learning.

8. A position detection apparatus comprising:

memory; and processor circuitry coupled to the memory, the processor circuitry being configured to:

acquire, as training data, a plurality of pieces of three-dimensional shape data of simple shapes that are not similar to each other, each of the plurality of pieces of three-dimensional shape data being three-dimensional shape data representing a simple shape obtained from a three-dimensional model, the simple shape being a shape simplified more than a shape of a target object;

carry out learning by using, as an input to a neural network, the simple shape represented by each of the plurality of acquired pieces of three-dimensional shape data;

acquire an image obtained by imaging by an imaging device; and detect a position of the target object from the acquired image by using a first learning model generated based on the learning.

\* \* \* \* \*